United States Patent
Ho et al.

(10) Patent No.: US 11,526,873 B1
(45) Date of Patent: Dec. 13, 2022

(54) RETAILER CARD INSTANT APPROVAL AND PROVISIONING

(71) Applicant: WELLS FARGO BANK, N.A., San Francisco, CA (US)

(72) Inventors: Peter Ho, Walnut Creek, CA (US); Andrew L. Martinez, San Francisco, CA (US)

(73) Assignee: WELLS FARGO BANK, N.A, San Francisco, CA (US)

( * ) Notice: Subject to any disclaimer, the term of this patent is extended or adjusted under 35 U.S.C. 154(b) by 190 days.

(21) Appl. No.: 16/536,966

(22) Filed: Aug. 9, 2019

Related U.S. Application Data

(60) Provisional application No. 62/717,368, filed on Aug. 10, 2018.

(51) Int. Cl.
| | |
|---|---|
| *G06Q 20/36* | (2012.01) |
| *G06Q 40/02* | (2012.01) |
| *G06Q 20/06* | (2012.01) |
| *G06Q 20/24* | (2012.01) |

(52) U.S. Cl.
CPC ......... *G06Q 20/3672* (2013.01); *G06Q 20/06* (2013.01); *G06Q 20/24* (2013.01); *G06Q 40/025* (2013.01)

(58) Field of Classification Search
CPC .... G06Q 20/3672; G06Q 20/06; G06Q 20/24; G06Q 40/025
See application file for complete search history.

(56) References Cited

U.S. PATENT DOCUMENTS

| | | | | |
|---|---|---|---|---|
| 8,504,470 B1* | 8/2013 | Chirehdast | ............. | G06Q 40/02 |
| | | | | 705/38 |
| 9,172,693 B2* | 10/2015 | Griffin | ................ | H04L 63/0815 |
| 9,256,717 B2* | 2/2016 | Tomfohrde | ........... | H04W 12/08 |
| 2009/0182661 A1* | 7/2009 | Irwin | ..................... | G06Q 40/00 |
| | | | | 705/38 |
| 2010/0306072 A1* | 12/2010 | Ford, Jr. | .............. | G06Q 20/202 |
| | | | | 705/38 |

(Continued)

OTHER PUBLICATIONS

Jain, Chintan. "Using Mobile Device IDs as Additional Factor of Authentication (Something You Have)," medium.com, https://medium.com/@cjainn/using-mobile-device-ids-as-additional-factor-of-authentication-something-you-have-80b6bd885950 (Oct. 13, 2017). (Year: 2017).*

*Primary Examiner* — Elizabeth H Rosen
(74) *Attorney, Agent, or Firm* — Foley & Lardner LLP

(57) ABSTRACT

A method performed by an issuer computing system includes receiving identification information for a customer from a retailer computing system. The customer is pre-approved for a payment account based on the identification information. A request to open the pre-approved payment account is received. Account registration information for opening the payment account and a mobile device identifier associated with the customer is received. The customer is approved for opening the payment account based on the account registration information. The payment account is established for the customer. Establishing the payment account includes generating a payment token for the payment account. In response to establishing the payment account, the payment token is automatically provisioned to a mobile wallet associated with the mobile device based on the mobile device identifier.

13 Claims, 5 Drawing Sheets

(56) References Cited

U.S. PATENT DOCUMENTS

| | | | | |
|---|---|---|---|---|
| 2014/0143075 A1* | 5/2014 | Eason, Jr. | ............ | G06Q 20/322 705/17 |
| 2014/0164243 A1* | 6/2014 | Aabye | .................... | G06Q 20/20 705/44 |
| 2015/0097683 A1* | 4/2015 | Sloo | .................. | H04M 1/72445 340/628 |
| 2017/0061532 A1* | 3/2017 | Koltnow | ................. | H04W 4/14 |

* cited by examiner

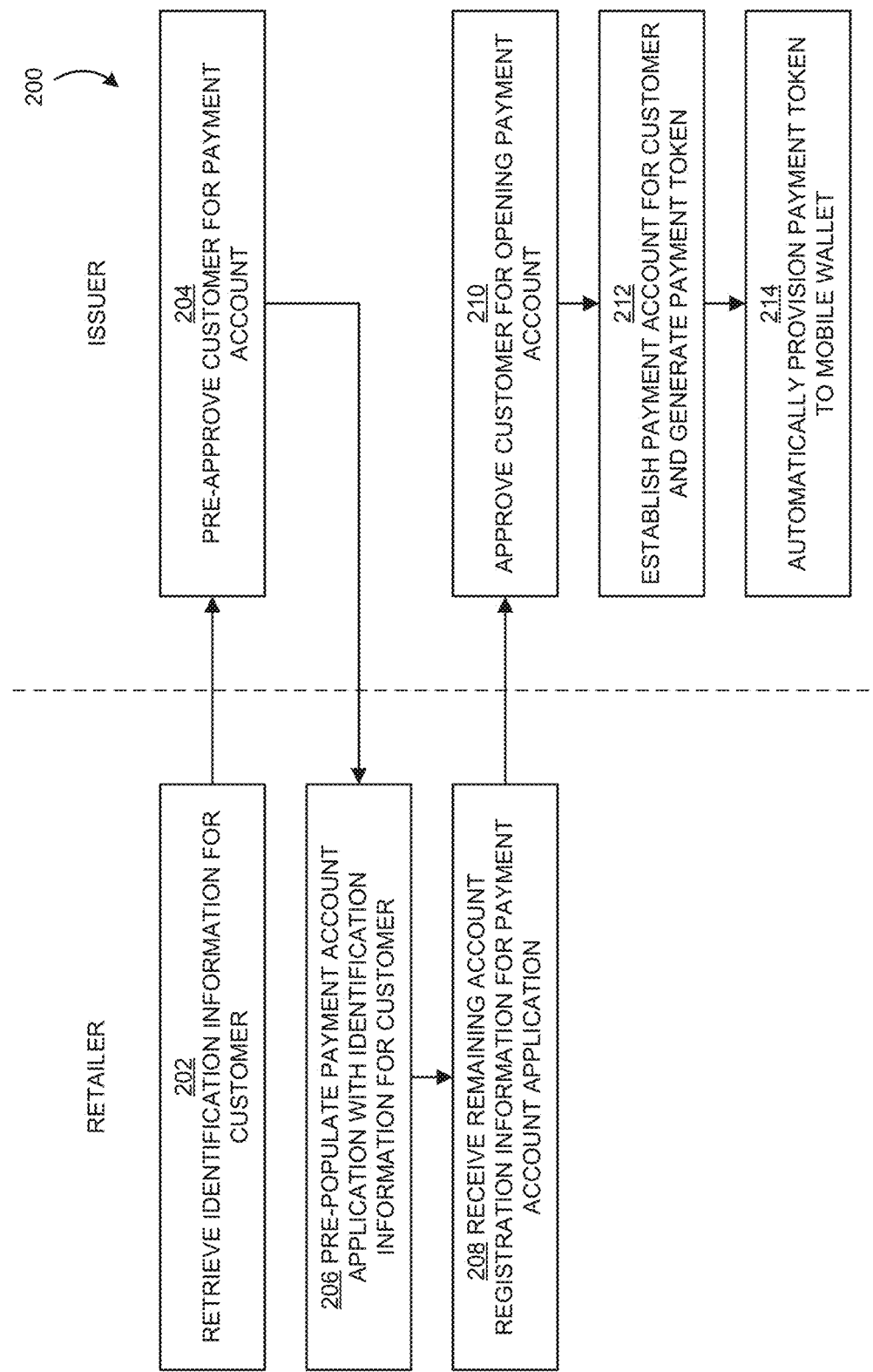

RETAILER CARD INSTANT APPROVAL AND PROVISIONING

CROSS-REFERENCE TO RELATED APPLICATION

This application claims the benefit of and priority to U.S. Provisional Patent Application No. 62/717,368 entitled "RETAILER CARD INSTANT APPROVAL AND PROVISIONING," filed Aug. 10, 2018, which is incorporated herein by reference in its entirety.

TECHNICAL FIELD

The present disclosure relates generally to providing payment functionality to a mobile device.

BACKGROUND

A mobile wallet (also referred to as a digital wallet) is an application on a computing device that allows an individual to make electronic transactions. Financial account information, such as payment accounts (e.g., demand deposit accounts, credit cards, debit cards, gift cards, pre-paid cards, etc.) and non-financial information (e.g., loyalty cards, rewards cards, identification cards, etc.) can be linked to a digital wallet. Individuals can use a mobile wallet to pay for a product by, for example, "tapping" a smartphone running the mobile wallet on a point-of-sale ("POS") device, upon which payment credentials are transmitted wirelessly (e.g., via a Near Field Communications ("NFC") transceiver or Bluetooth) to the POS device to complete the purchase.

SUMMARY

Various embodiments relate to computer-implemented methods performed by an issuer computing system. An example method includes receiving identification information for a customer from a retailer computing system. The customer is pre-approved for a payment account based on the identification information. The customer is notified of the pre-approval and asked if they would like a credit account. Assuming the customer says yes, a request to open the pre-approved payment account is received. Account registration information for opening the payment account and a mobile device identifier associated with the customer is received. The customer is approved for opening the payment account based on the account registration information. The payment account is established for the customer. Establishing the payment account includes generating a payment token for the payment account. In response to establishing the payment account, the payment token is automatically provisioned to a mobile wallet associated with the mobile device based on the mobile device identifier.

Various other embodiments relate to computer-implemented methods performed by a retailer computing system. An example method includes retrieving identification information for a customer. The identification information is transmitted to an issuer computing system. A pre-approval message indicating that the customer is pre-approved to open the payment account is received from the issuer computing system. Account registration information for opening the payment account is received from the customer. The account registration information is transmitted to the issuer computing system. In response to establishing the payment account for the customer, a payment token is automatically provisioned to a mobile wallet associated with the customer.

Still various other embodiments relate to a computer-implemented method performed by a retailer computing system. An example method includes retrieving identification information for a customer. The identification information is transmitted to an issuer computing system in order to open a payment account issued by an issuer associated with the issuer computing system and relating to a retailer associated with the retailer computing system. Information regarding a mobile device of the customer is received during a transaction between the customer and the retailer. The information regarding the mobile device and the identification information for the customer is transmitted to the issuer computing system. An indication of an approval and an establishment of the payment account for the customer is received from the issuer computing system. In response to approving and establishing the payment account for the customer, a payment token is automatically provisioned to a mobile wallet associated with the mobile device based on the information regarding the mobile device that was transmitted to the issuer computing system. As such, mobile wallet transactions using the payment token may subsequently be performed.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

BRIEF DESCRIPTION OF THE DRAWINGS

FIG. 2 is a flow diagram illustrating a method of automatically provisioning a payment token to a mobile wallet in response to approving and establishing a payment account, according to an example embodiment.

DETAILED DESCRIPTION

Figure 1:
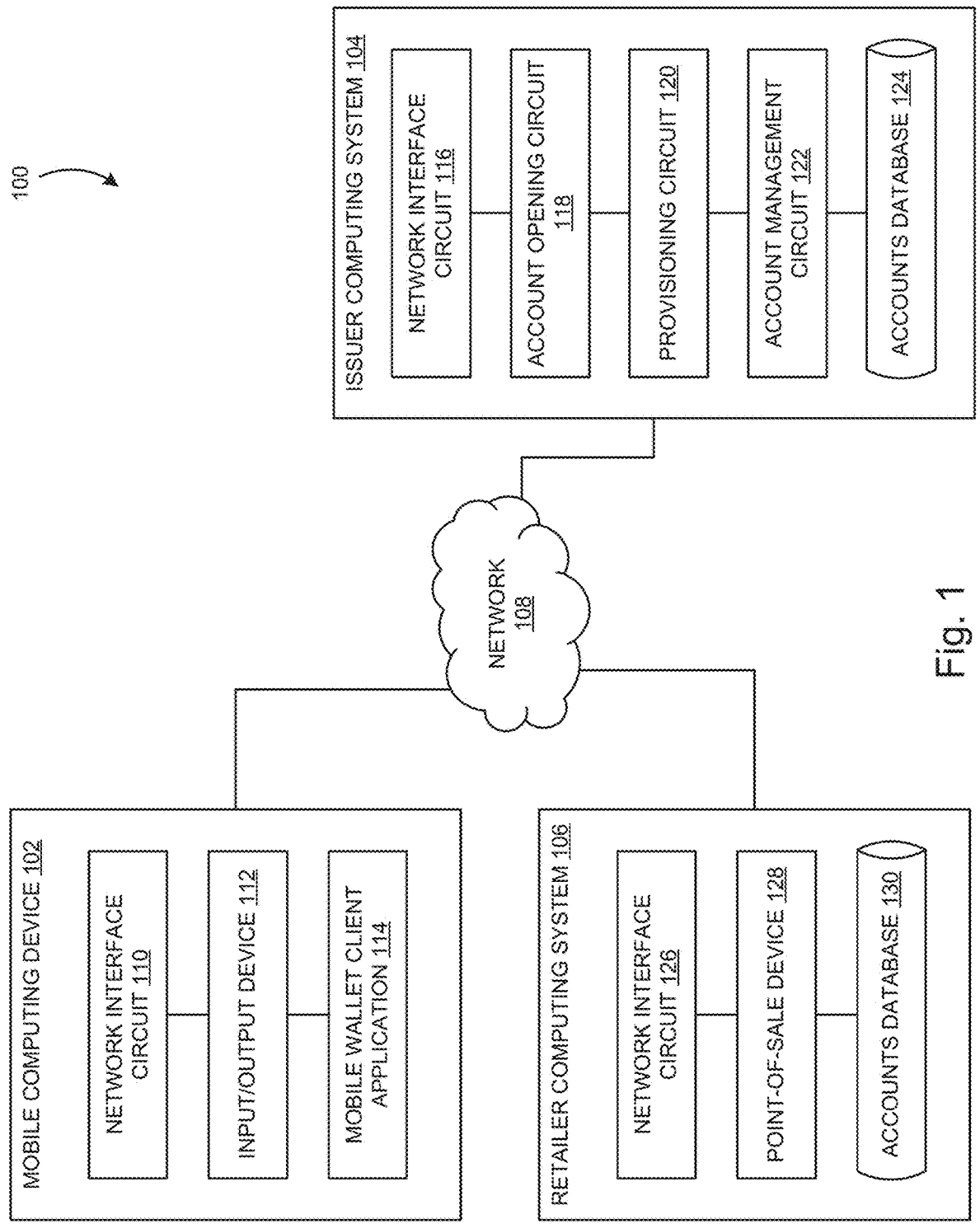
FIG. 1 is a block diagram of a payment account approval and provisioning system, according to an example embodiment.

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Payment accounts are added to mobile wallets via a process called "provisioning." In some existing systems, an individual approved for a new payment account must wait to receive a physical payment card in the mail and manually enter the payment card information into the mobile wallet interface to provision the payment account to the mobile wallet.

In order for the issuer of the payment account to provision the payment account (or a corresponding payment token) to a customer's mobile wallet without customer input, the issuer needs a mobile device identifier of the mobile wallet to which the payment account is to be provisioned. The "mobile device identifier" or "information regarding the mobile device" may include, but is not limited to, a secure element identifier, an International Mobile Equipment Identity ("IMEI") value, an electronic serial number ("ESN"), a Media Access Control ("MAC") value or address, and/or any other identifiers associated with the mobile device. In certain instances, this information may also include a phone number after the phone number has been bound to a particular device. The issuer does not always have access to this information. Therefore, the issuer may require interaction with a third party (e.g., a mobile network operator) or may require further input from the customer in order to provision the payment account to the customer's mobile wallet.

Various embodiments relate to systems and methods for automatically provisioning a payment token to a mobile wallet in response to approving and establishing a payment account. In some embodiments, the payment account is a private label credit card branded by a retailer and issued by an issuer. In connection with the customer applying for the payment account with the retailer, the retailer transmits customer identification information and a mobile device identifier to the issuer. The mobile device identifier uniquely identifies the mobile device of the customer to which the payment token for the payment account is to be provisioned. The issuer automatically provisions the payment token for the newly established payment account to the customer's mobile wallet with minimal input required from the customer. Accordingly, the systems and methods described herein enable a seamless provisioning of a payment token to a mobile wallet upon establishing a new payment account.

According to various embodiments, the retailer can obtain the mobile device identifier in various ways. For example, in some embodiments, the retailer is a mobile network operator or a mobile computing device manufacturer, and the payment account (e.g., a private label credit card account branded by the retailer) is offered to the customer in connection with a transaction between the customer and the retailer that involves a mobile computing device (e.g., a smartphone). For example, the customer may be purchasing a mobile computing device from the retailer, upgrading an existing mobile computing device with a new mobile computing device, or changing a service plan for the mobile computing device. In this instance, the retailer knows various details about the customer's mobile computing device, such as the brand, model, operating system, native mobile wallet, IMEI, secure element ID, phone number, etc. Therefore, the retailer can transmit this information to the issuer, and the issuer can automatically provision a payment token for the new payment account to the customer's mobile computing device in connection with the transaction with minimal input required from the customer. This eliminates the need for the customer to enter account information or otherwise actively request provisioning through the mobile wallet.

According to other embodiments, the retailer is not a mobile network operator or mobile computing device manufacturer. For example, the retailer may be a department store. In such embodiments, the retailer may know various details about the customer's identity from the customer's rewards or loyalty account with the retailer. However, in contrast to the example above, the retailer does not know the customer's mobile device identifier. Accordingly, the retailer may obtain the mobile device identifier in other ways, such as by tapping the mobile computing device on a POS device to cause identifying information about the mobile computing device to be transmitted wirelessly (e.g., via NFC) to the POS device of the retailer. In a similar manner as above, the retailer can transmit information about the customer's mobile device to the issuer to enable a payment token to be automatically provisioned to the customer's mobile wallet on the customer's mobile computing device.

The systems and methods described herein leverage information about the customer that is shared between the retailer and the issuer. This reduces or eliminates the need for the customer to redundantly provide the same information to the retailer and the issuer. For example, the customer may have to provide or may have provided various identification information to the retailer in connection with the customer purchasing the mobile computing device or service plan, or signing up for a loyalty or rewards program. For example, the retailer may know the customer's name and address, social security number, auto-pay account, etc. Instead of requiring the customer to re-enter some or all of this information to the issuer, the retailer may provide this information to the issuer. In various implementations, the retailer and the issuer, via operative communication with each other, pre-populate forms and customer profiles with the identification information provided to the retailer or to the issuer. This reduces the friction for the customer to register the new payment account and provision a new payment token to the customer's mobile wallet.

The systems and methods described herein relate to payment account approval and provisioning systems that utilize a specific series of steps to reduce the amount of friction and input required from a customer to apply for a new payment account and to provision a payment token for the payment account onto the customer's mobile computing device during or based on an interaction between the customer and the retailer. For example, according to various embodiments, a retailer with which the customer is applying for the payment account transmits identifying information of the customer's mobile wallet or mobile computing device to the issuer in connection with the process of opening the customer's new payment account. The issuer can then automatically provision a payment token to the customer's mobile computing device upon approving the customer's new payment account. This series of steps enables new functionality that is not possible with existing systems. For example, as will be appreciated, existing systems require further action from the customer to provision a payment token to the customer's mobile computing device.

The systems and methods described herein provide technical solutions to various problems associated with provisioning payment tokens to mobile computing devices. For example, a customer approved for a new payment account typically must wait several days to receive a physical payment card before the customer can provision the card (e.g., a payment token identifying the card) to the customer's mobile wallet. Accordingly, there is a substantial lag between the time that the customer's new account is approved until the customer can use the new account via a mobile wallet. In contrast, the systems and methods described herein automatically provision a payment token to the customer's mobile wallet upon the issuer approving the customer's new payment account, so the customer can immediately use the new payment account via the customer's mobile wallet to complete transactions. For example, a customer can apply for a retailer-branded credit card in connection with purchasing a new smartphone from a retailer. Once the account is approved, a payment token for the retailer branded credit card is provisioned to a mobile wallet on the customer's new smartphone, which the customer can use immediately to purchase an accessory for his or her new smartphone.

Referring now to FIG. 1, a block diagram of a payment account approval and provisioning system 100 is shown, according to an example embodiment. As shown, the payment account approval and provisioning system 100 includes a mobile computing device 102 associated with a customer, an issuer computing system 104 associated with an issuer financial institution, and a retailer computing system 106 associated with a retailer. The various systems and devices are operatively and communicatively coupled through a network 108, which may include one or more of the Internet, cellular network, Wi-Fi, Wi-Max, a proprietary banking network, or any other type of wired or wireless network or a combination of wired and wireless networks. As described herein, the payment account approval and provisioning system 100 may be used to automatically provision a payment token to a mobile wallet of the mobile computing device 102 of the customer in response to approving and establishing a payment account for the customer.

The mobile computing device 102 includes a network interface circuit 110, an input/output ("I/O") device 112, a secure element 114, and a mobile wallet client application 116. The mobile computing device 102 may also include other features, such as a NFC transceiver, that enable mobile wallet transactions (for examples, the NFC transceiver may send payment information to a NFC receiver, such as a POS terminal, based on a NFC tap between the mobile device 102 and the NFC receiver in order to effectuate a transaction for a good or service). The mobile computing device 102 may be, for example, a cellular phone, smartphone, wearable device, internet of things ("IoT") device, mobile handheld wireless e-mail device, personal digital assistant, portable gaming device, or other suitable device.

The network interface circuit 110 includes, for example, hardware and associated program logic that connects the mobile computing device 102 to the network 108 to facilitate operative communication with the mobile computing device 102, the issuer computing system 104, and the retailer computing system 106.

The I/O device 112 includes hardware and associated program logic configured to enable the mobile computing device 102 to exchange information with a customer (e.g., via a touch display) and other devices (e.g., a merchant POS device as described above). The I/O device 112 may include systems, components, devices, and apparatuses that serve both input and output functions and are configured to exchange information with external systems (e.g., a merchant POS devices, computing devices associated with other individuals, etc.). Such systems, components, devices and apparatuses include, for example, radio frequency transceivers (e.g., radio frequency ("RF") or NFC transceivers) and other short range wireless transceivers (e.g., Bluetooth®, laser-based data transmitters, etc.).

The mobile wallet client application 114 is structured to facilitate and permit payments by interfacing with various accounts held by the customer at various financial institutions (e.g., the financial institution associated with the issuer computing system 104 and/or other financial institutions). Accordingly, in some arrangements, the mobile wallet client application 114 is communicably coupled via the network interface 110 over the network 108 to the issuer computing system 104 and to the retailer computing system 106.

In various arrangements, the mobile wallet client application 114 is structured to permit mobile wallet customers to engage in transactions through the initiation of communications with, for example, a merchant POS device. It should be understood that the role that the mobile wallet client application 114 takes in payment transactions will depend on the implementation of the mobile wallet. In some arrangements, for example, the credential in the mobile wallet is implemented in a secure manner. In such arrangements, the mobile computing device 102 includes a secure element that is separate from the main system memory of the customer mobile device. The secure element may include any element having smart card functionalities, such as a universal subscriber identity circuit (a SIM card) or a secure digital card. In such arrangements, customer authentication information (e.g., payment account information, customer PINs, and the like) is stored in the secure element. In various arrangements, the secure element of the mobile computing device 102 may include a payment application that interfaces with a NFC transceiver of the mobile computing device 102 responsive to receiving a communication (e.g., an application protocol data unit) from the merchant POS device to enable customer payment information be transferred. In such arrangements, no customer information is transferred by the mobile wallet client application 114 to the NFC transceiver. After customer payment information is transmitted to the merchant POS device, the mobile wallet client application 114 may query the secure element for transaction data to notify the customer of the completed transaction.

In other arrangements, the mobile wallet client application 114 may operate under a host card emulation framework. In such arrangements, customer payment information is maintained within the mobile wallet client application 114 or cloud-based environment (e.g., a host emulation service) rather than in the secure element. In this regard, the mobile wallet client application 114 may include a service component (e.g., a payment application) configured to interface with the NFC transceiver of the mobile computing device 102 to communicate customer payment tokens to the merchant POS device. To ensure security of customer information, the mobile wallet client application 114 may include sandboxing functionalities where a unique customer ID ("UID") is assigned to the mobile wallet client application 114 and where only other applications including the same UID may share information stored in relation to the mobile wallet client application 114.

In some arrangements, the mobile wallet client application 114 is structured to enable the customer to manage a mobile wallet. In this regard, the mobile wallet client application 114 is structured to present, control, and otherwise manage displays or graphical user interfaces on the mobile computing device 102 including information pertaining to various payment accounts. For example, the mobile wallet client application 114 may present the customer with displays enabling the customer to input information pertaining to various payment accounts. The screens may enable the customer to manually input information (e.g., a primary account number ("PAN")) pertaining to a payment account or enable the customer to take a picture of a payment account in order to provision a payment token for the payment account to the mobile wallet client application 114. The mobile wallet client application 114 may then process the information input by the customer, identify account information, and transmit the information to the issuer computing system 104 for storage in association with the customer. A payment token (e.g., a tokenized version of the PAN) is then provisioned to the mobile wallet client application 114. Once information pertaining to various payment accounts has been entered into the mobile wallet client application 114, the mobile wallet client application 114 is configured to present displays that enable the customer to select a payment account from amongst a plurality of payment accounts. Once a payment account is selected, the displays may further enable the customer to perform various actions using the selected payment account (e.g., use the selected account to complete a mobile wallet transaction, manage an account at a financial institution associated with the selected payment account, view a transaction history associated with the payment account, and the like).

In some embodiments, in addition to the mobile wallet client application 114, the mobile computing device 102 also includes a client application (not shown) associated with the financial institution of the issuer computing system 104. For example, the client application may be a mobile banking application configured to provide the customer with displays enabling the customer to manage accounts held by the customer at the financial institution.

The issuer computing system 104 includes a network interface circuit 116 to communicate data over the network 108, an account opening circuit 118, a provisioning circuit 120, an account management circuit 122, and an accounts database 124. The issuer computing system 104 is operated by an issuer financial institution and is configured to establish and maintain customer financial accounts. The issuer financial institution may include commercial or private banks, credit unions, investment brokerages, or the like.

The account opening circuit 118 is configured to evaluate applications for opening new payment accounts, to pre-approve new payment accounts, and to establish payment accounts upon approval of applications. For example, the account opening circuit 118 may receive identification information relating to the customer, perform a soft credit pull based on the identification information, and pre-approve the customer for a payment account. A soft-credit pull is a credit pull often performed by financial institutions to assess the credit worthiness of an applicant that does not affect the applicant's credit score (e.g., a pre-approval credit rating). A hard-credit pull is similar to a soft credit pull, but the hard credit pull may and often does affect the applicant's credit score. Hard credit pulls are often used in the final stages of the mortgage approval process. The account opening circuit 118 may also receive application information relating to the customer (which may include the identification information and/or additional information), perform a hard credit pull based on the application information, approve the customer for the payment account, and establish the payment account.

The provisioning circuit 120 is configured to provision a payment token to the mobile wallet client application 114 in response to approving the customer for a new payment account. A payment token is an algorithmically-generated number that is used as a surrogate or proxy for the PAN of the customer's payment account. The payment token can be passed through the network 108 to process the payments without actual payment account details (e.g., the PAN) being exposed. The actual PAN is held in a secure token vault. During a transaction, the payment token is passed through a POS through to the issuer (or, the entity maintaining the token vault), where the payment token is cross-referenced with the tokens in the token vault to determine the associated payment account. The determined payment account is then used for the transaction. Beneficially, the actual PAN is not passed through the POS and the retailer/merchant computer system, which mitigates fraud potential.

The account management circuit 122 is configured to manage the financial accounts of various customers, including maintaining and handling transaction processing for various customer accounts. In some embodiments, the account management circuit 122 is configured to provide a client application (e.g., a mobile banking application). In this regard, the account management circuit 122 is configured to provide interfaces, displays, and associated content to enable management of customer accounts at the financial institution associated with the issuer computing system 104. The account information for the financial accounts of the various customers is stored in the accounts database 124.

The retailer computing system 106 includes a network interface circuit 126 to communicate data over the network 108, a POS device 128, and an accounts database 130. The POS device 128 is a computing device that interfaces with payment devices (e.g., payment cards, mobile wallets, etc.) to make electronic funds transfers. The POS device 128 can include an NFC transceiver to facilitate contactless transactions. The POS device 128 can also serve as a comprehensive customer engagement device. For example, in some implementations, a customer can apply for a payment account via the POS device 128. Account information for accounts (e.g., service plans, loyalty or rewards accounts, etc.) is stored in the accounts database 130. In other examples, the retailer computing system 106 may be an online merchant and not be associated with a POS device 128. Thus, depending on the configuration of the retailer associated with the retailer computing system 106, the precise structure of the system may vary.

The retailer computing system 106 is associated with a retailer or merchant. As mentioned above, the retailer or merchant may be a mobile network operator, a mobile computing device manufacturer, a store such as a department store, and so on. In each situation and in some embodiments described herein, the retailer or merchant is associated with a payment account issued by the issuer associated with the issuer computing system 104. For example, the payment account may be a private label credit card branded by a retailer and issued by an issuer (e.g., a retailer-specific payment card issued by the issuer). In particular, when the retailer is a department store, the payment account may be a payment account associated with a department-store specific credit card (e.g., a Dillard's credit card, a Kohl's charge card, etc.). As another example, the retailer may be an automotive retailer (therefore, e.g., the payment account may be associated with the automotive retailer such as a GM credit card). As yet another example, the retailer may be a mobile network operator, such that the payment account is associated with this operator (e.g., a Verizon credit card). As will be appreciated, the type of retailer is widely variable. But, a unifying characteristic of the "retailer" or "merchant" herein, is that the payment account is associated with the retailer in that the customer may apply for a payment account that is associated with the retailer during a transaction or an engagement with the retailer. In this regard, the payment card (e.g., credit card, debit card, loyalty/rewards card, etc.) may be branded or otherwise associated with the retailer. Thus, the user may receive particular benefits when using the card and the payment account with the particular retailer as opposed to generally using the card at other merchants/retailers.

Because the amount of information that the retailer knows, may know, or otherwise has access to regarding the customer may vary based on the retailer type, the process of automatic provisioning of a payment token associated with the retailer may vary based on the retailer type. These processes are explained herein with respect to FIG. 2.

Referring now to FIG. 2, a flow diagram illustrating a method 200 of automatically provisioning a payment token to a mobile wallet in response to approving and establishing a payment account is shown, according to an example embodiment. In the example embodiment illustrated in FIG. 2, the method 200 is performed by an issuer operating the issuer computing system 104 and a retailer operating the retailer computing system 106 of FIG. 1.

At 202, identification information for a customer is retrieved by the retailer. The customer can be a new or existing customer with the retailer. For example when the retailer is a mobile network operator or a mobile device manufacturer, the customer may be purchasing a mobile computing device, upgrading an existing mobile computing device with a new mobile computing device, or changing a service plan for the mobile computing device. The retailer may have the customer's identification information on file in a customer account (e.g., a service account, a loyalty account, etc.). In some embodiments, the retailer retrieves the customer's identification from the customer (e.g., via the customer entering the information into a terminal or device operated by the retailer or by the customer). For example, for a new customer and when the retailer is a department store, the customer may be prompted by an employee of the department store to provide information regarding the customer (e.g., at a computer of the employee). The retailer computing system 106 may then store such information in the accounts database 130.

At 204, the issuer pre-approves the customer for opening a payment account based on the customer's identification information. In some embodiments, the payment account is a private label credit card branded by a retailer associated with the retailer computing system. In some implementations, the issuer performs a soft credit pull based on the identification information for the customer in order to evaluate the credit-worthiness of the customer in order to pre-approve the customer. The issuer transmits a pre-approval message to the retailer and/or to the customer. In this example, the customer may be engaging with the retailer to apply for and obtain a payment account associated with the retailer. The customer is notified of the pre-approval and asked if they would like the account. Assuming the customer says yes, a request to open the pre-approved payment account is received by the retailer computing system.

At 206, the retailer pre-populates a payment account application with identification information for the customer. In some implementations, the retailer may have all of the information necessary to pre-populate the entire payment account application. In other implementations (e.g., based on the retailer type), the retailer may have some but not all of the information to pre-populate the payment account application. For example, the retailer may have the customer's name and address but may not have the customer's salary and monthly mortgage or rent payment amount.

At 208, the retailer receives remaining account registration information for the customer to complete the payment account application. In some implementations, the customer enters this information in a terminal or computing device (e.g., tablet) operated by the retailer. In other implementations, the customer may enter this information on his or her own mobile computing device. The retailer or the customer then transmits the account registration information to the issuer. According to another embodiment, the retailer computing system 106 may prompt the customer to answer whether he/she is associated with the issuer associated with issuer computing system 104 (e.g., the prompt may be on the POS device 128 or a terminal/tablet of the retailer). If the customer indicates yes and agrees to the issuer to retrieve his/her identifying information, the retailer computing system 106 need not acquire all the necessary information regarding the customer because such information is stored and accessible by the issuer computing system 104 (e.g., stored in the accounts database 124). This situation takes advantage of the possibility where the customer is an existing customer of the issuer associated with the computing system 104.

At 210, the issuer approves the customer for opening the payment account. For example, in some implementations, the issuer performs a hard credit pull based on the account registration information. In some implementations, the issuer has sufficient information on-file for the customer to approve the customer without having to perform a hard credit pull (this situation alludes to when the customer is an existing customer of the issuer).

At 212, the issuer establishes the payment account for the customer and generates a payment token. The payment account has an associated PAN. As noted above, the payment token is a surrogate value for the PAN.

At 214, the issuer automatically provisions the payment token to the customer's mobile wallet. This enables the customer to immediately use the payment account to conduct transactions. In another embodiment, the issuer automatically provisions the PAN of the payment account to the customer's mobile wallet. The PAN may be subsequently tokenized by the issuer or another token provider for use in subsequent transactions. Thus, either a payment token or the PAN associated with the payment account may be automatically provisioned to the customer's mobile wallet running or operating on the mobile device 102.

Before the actual provisioning of the payment token in process 214, additional steps may also be performed that lead to the provisioning.

First, the issuer computing system 104 may ping, transmit a message, or otherwise communicate with the mobile device running the mobile wallet to validate that the mobile device belongs to the customer (the account holder). This process can be done in a variety of ways. In one embodiment, during the processes 206-208, the issuer computing system 104 may receive an indication of an acceptance from the customer to a phone binding arrangement from the payment account application. The phone binding arrangement indicates that the mobile device 102 belongs to the customer. In this regard, information regarding the mobile device may be bound to the customer (e.g., a map or cross-linking of the IMEI to the customer, a map of other device information to the customer, etc.). These exemplary "maps" may be stored by the issuer computing system 104 (e.g., in the accounts database 124). In another embodiment, a call to another trusted entity is made by the issuer to validate that the device 102 belongs to the customer. For example, the issuer may reach out to the retailer who provided or sold the mobile device to the customer (in the example where the retailer is a seller of the mobile device). In either embodiment, the issuer computing system 104 validates the mobile device as belonging to the customer, so that the token or PAN is provisioned to the device owned by, belonging to, or otherwise associated with the customer.

Second, mobile device 102 information of the customer is obtained. This information (e.g., device information as described above) may be acquired from the retailer and/or during the payment account application process described above. This mobile device information or phone information ensures that the PAN or payment token is sent to the correct mobile device. This step ensures that the correct device will receive the PAN or payment token.

Third, the mobile device is provisioned with either the payment token or the PAN. Based on the foregoing, a few examples of the automatic provisioning of the payment token based on the retailer type may be described as follows.

As a first example, the retailer is be a mobile network operator or a mobile device seller. In operation, the customer may apply for a payment account associated with the retailer (e.g., a branded or co-branded credit card with the retailer). For example, the customer may apply for a payment account in a store associated with the mobile device provider or mobile network operator. The issuer, via the issuer computing system 104, backing the mobile device or mobile network operator-branded or sponsored card approves the application. During the provisioning process based on the information known by the mobile device seller or mobile network operator (e.g., device identification number, universal device identification number, MAC address, etc.), the issuer computing system 104 may have the necessary information regarding the mobile device and the customer to provision the payment token associated with the account directly to the known mobile device 102. In this instance, information regarding the mobile device and the customer is readily known between the retailer and the issuer because the retailer has knowledge of the mobile device.

As a second example, the retailer is a merchant, such as a department store. Unlike the above example where the retailer is the mobile device seller or network operator and has knowledge of the identifying information regarding the mobile device (e.g., a mobile device identifier), in this instance, the merchant does not have information regarding the mobile device. While the issuer has or may have knowledge of the customer, neither the merchant nor the issuer may have information regarding the mobile device. Thus, additional information regarding the mobile device may be needed so that the issuer computing system 104 can automatically provision the payment token associated with the account to the mobile device. In these situations, the issuer computing system 104 may obtain, acquire, or otherwise receive information regarding the mobile device in a variety of ways. For example and upon a determination that the issuer computing system 104 does not have information regarding the mobile device associated with the customer, the issuer computing system 104 sends a communication to the retailer computing system 106 to ping, prompt, ask, or otherwise inquire an employee associated with the retailer computing system 106 to obtain information from the customer regarding the mobile device. The customer or employee may then provide this information to a terminal associated with the retailer computing system 106, which transmits the information to the retailer computing system 106, which sends the required information to the issuer computing system 104. In another example, the user may have provided their phone number during the payment account application. In turn, the mobile device phone number is provided via the retailer computing system 106 to the issuer computing system 104. The issuer computing system 104 may then send one or more messages that ask the user to provide relevant information or to access the relevant information regarding their mobile device (e.g., device identifiers, mobile wallet identifier, etc.). For example, by providing an indication of "ok," an API may access the mobile device information and cause the mobile device to transmit the accessed information to the issuer computing system 104. Upon receiving such information and approving the application, the issuer computing system 104 may send the payment token (or, PAN in some embodiments) to the mobile device to automatically provision the token to the mobile wallet.

As an alternative to this situation, the customer may be purchasing an "unlocked" phone (e.g., a phone on Amazon that is later activated on a desired wireless network such as Verizon). Here, the retailer may be a distributor of the mobile device. In this instance, neither the issuer computing system 104 nor the retailer computing system 106 may have knowledge of the information regarding the phone (e.g., mobile device identifier, etc.). Alternatively, the retailer may catalog their distributed phones. As such, when the person applies for a payment account associated with the retailer, the retailer computing system 106 may provide information regarding the mobile phone to the issuer computing system 104 to facilitate an automatic provisioning of a payment token to that mobile phone. If this information is not known, the issuer computing system 104 may provide one or more messages or prompts to the customer using their known information (e.g., phone number, address so that the messages are sent via mail, etc.) to acquire the phone information so that the payment token can be provisioned directly to the mobile wallet running on this mobile phone. While this process may be similar to that described above, in this instance, an additional security check may be implemented in order to ensure that the mobile phone is not associated with a different user (for example, the customer may have bought this phone from an exchange such as eBay from a previous owner). In this instance and after acquiring the mobile phone information, the issuer computing system 104 may search the accounts database 124 to confirm that this information is not associated with another user. If not, provisioning of the payment token may occur in a manner described above. If so, the account management circuit 122 deletes the on-record association such that the previous owner is no longer associated with this mobile device. The phone information may then be associated with the customer. Upon this association, the provisioning of the payment token (or PAN) may occur in the same or similar manner as described herein. Thus, even when the retailer does not immediately know the relevant information regarding the mobile device, the present disclosure still may enable a provisioning of the payment token to the customer's mobile wallet automatically or nearly automatically and with minimal customer input. The Retailer may also go through a device binding process the first time the customer logs into the Retailer's mobile application for the first time on a new device. In this way, information regarding the mobile device is bound or tied to the particular customer.

As another example and when the customer is at the retail store environment, the store employee may have the control to push the provision to the mobile device from a tablet/terminal of employee. For example, the payment token may be sent to the terminal of the store employee who then may transmit the payment token to the mobile device. As an example, the store employee may instruct the customer to NFC tap their mobile device to the terminal, which causes the terminal to transmit the payment token to the mobile device and is provisioned in the mobile wallet. As a different way, the store employee may be provided with a graphical user interface where he/she simply clicks "ok" or a like a message which causes the provisioning. In this instance, the payment token may remain with the issuer computing system 104 (or, token provider if the issuer outsources tokenization). Upon receiving an indication of approval from the store employee, the issuer computing system 104 provisions the payment token to the mobile wallet of the mobile device. In this example, the store employee has the power to control the provisioning.

As another specific example when the retailer is a merchant (e.g., Nordstrom), the customer may be in a checkout lane. The customer may desire a merchant-branded card and apply for the payment account associated with the merchant at the checkout lane. Assuming neither the issuer nor the merchant have knowledge regarding the mobile device (e.g., to enable a provisioning to the mobile device), the customer may perform a NFC tap of their mobile device to a terminal associated with the retailer computing system 106. The tap transmits information regarding the mobile device to the terminal (e.g., mobile device identifier), which then routes or transmits the information to the issuer computing system 104 (either via the retailer computing system 106 or directly—for example, the transmission of information may include information regarding the issuer to enable a direct transmission of the mobile device information to the issuer computing system 104). To cause the provision transmission, the store employee may push the provision over the network or instruct the customer to tap their mobile device to the tablet/terminal of the employee. In this latter scenario, a NFC tap may transmit the payment token from a terminal associated with the retailer computing system 106 to the mobile device of the customer. This NFC tap transmission may serve as an extra layer of security to ensure the payment token is provisioned to the correct mobile wallet.

As a third example, the retailer may be an online merchant. In this case, the customer is not physically present at the retailer. For example, the retailer may be a mobile device provider, a mobile network operator, or merchant/store like described above. In these instances, the customer may be online shopping. As a particular example, the online merchant may be a mobile device provider. At checkout and after the customer has chosen a new phone, the retailer computing system 106 may provide a prompt to inquire if the user would like to purchase the phone with a new credit card associated with the retailer. Assuming the user responds with a "yes," the user's payment details for purchasing the new phone may be used to begin the application for the new credit card. During the application process, the retailer computing system 106 may send information regarding the phone to the issuer computing system 104. Assuming the credit card is approved by the issuer, the issuer computing system 104 can automatically provision the payment token associated with the new credit card to a mobile wallet on the new phone. However, the mobile wallet may not be installed or the issuer may desire to wait until the user has the phone in order to add security. Accordingly, once the user receives the new phone, an email may be in their inbox from the issuer computing system 104 asking them if they would like to provision the new credit card associated with the retailer to their mobile wallet. When the issuer computing system 104 receives an indication of "yes" (e.g., a graphical user interface in the email may have a button indicating yes that when clicked, sends a notification over the network to the issuer computing system), the issuer computing system 104 causes a transmission of the payment token over the network to the mobile device to provision the payment token (or, in some embodiments, PAN) associated with the new credit card in the mobile wallet. As a wrinkle, the mobile wallet may be provided by the issuer via the issuer computing system 104. As such, when the mobile wallet is downloaded onto the new phone, the mobile wallet may come preloaded with the payment token associated with the new credit card. In any of these situations, minimal customer input is needed to load a payment token associated with an account issued by the issuer and related to the retailer.

As a fourth example, the retailer may provider an application that runs on the mobile computing device 102. A user may be online shopping via the application, and wants to obtain a payment account associated with the retailer. While in the application, the customer may provide this indication. This indication is transmitted to the retailer computing system 106, which transmits the request to the issuer computing system 104. Along with this information, the retailer application may access and provide information regarding the mobile device to the issuer computing system 104 (e.g., mobile device identifier, etc.). The issuer may approve and establish the new payment account like described above. The issuer computing system 104 may query to see if the customer has a mobile wallet on that mobile device 102 based on the transmitted device information. If so and using the device information, the issuer computing system 104 may cause an automatic provision of a payment token associated with the new payment account associated with the retailer in the mobile wallet. Advantageously, the user may accomplish all of these actions from within the retailer application. Therefore, once he/she opens the mobile wallet, the customer may be pleasantly surprised to see the new payment account.

Beneficially and as described herein, the combination of the information regarding the customer that may be known by the issuer computing system 104 with information regarding the mobile device that may be known or acquired by the retailer computing system (e.g., device identifying information, mobile wallet information, etc.) may enable an automatic provisioning of a payment token to the mobile wallet of the mobile device with minimal customer involvement. Such provisioning may occur when a payment account is applied for that is associated with the retailer (e.g., a retailer branded credit card issued by the issuer). By leveraging the information of each entity, relatively faster provisioning of these specialty cards may be accomplished as compared to conventional processes.

Figure 3A:
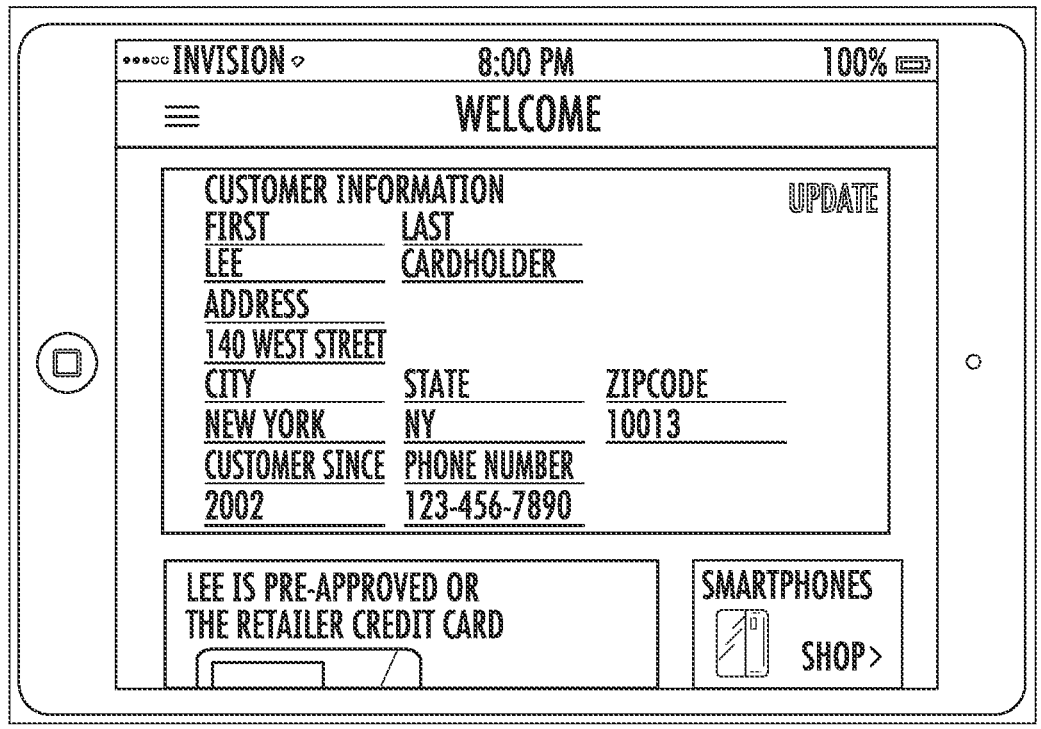
FIGS. 3A-3E illustrate various user interface screens in connection with establishing a payment account and automatically provisioning a payment token for the payment account to a mobile wallet, according to various embodiments.

FIGS. 3A-3E illustrate various user interface screens in connection with establishing a payment account and automatically provisioning a payment token for the payment account to a mobile wallet. FIG. 3A illustrates a screen showing the customer's identification information. The customer's identification information can be inputted by the customer or pre-populated by the retailer. The customer's identification information is transmitted to the issuer. The issuer pre-approves the customer for a new payment account based on the customer's identification information.

Figure 3B:
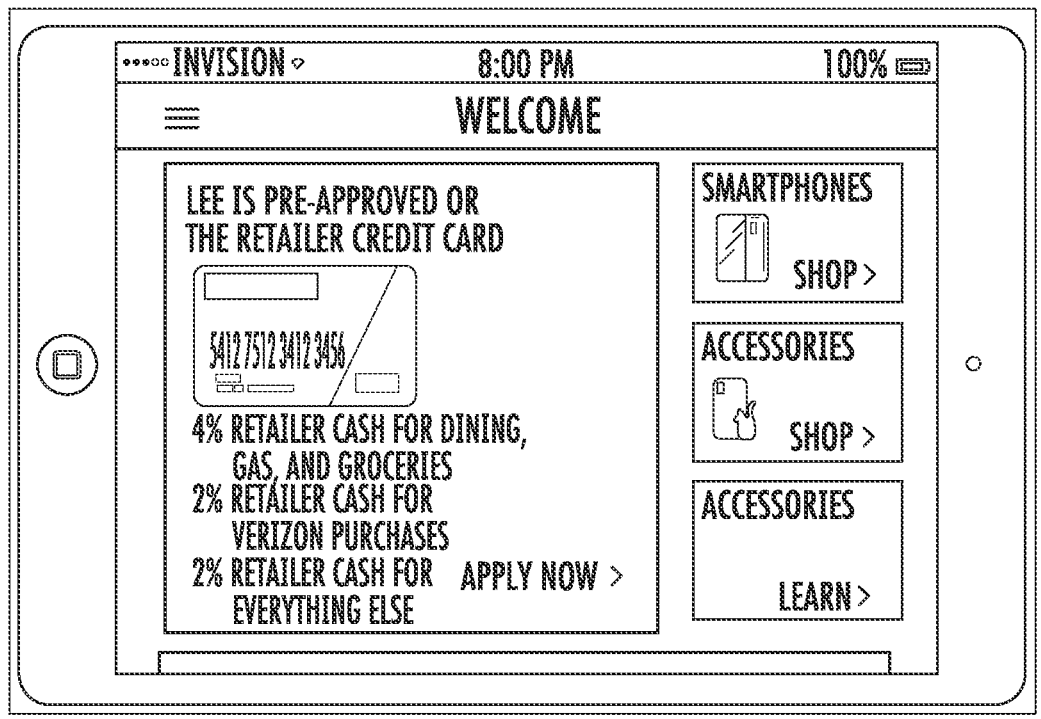

FIG. 3B illustrates a screen indicating that the customer is pre-approved for the new payment account.

Figure 3C:

FIG. 3C illustrates a screen showing the customer's account registration information for opening the new account. As shown, the retailer can automatically pre-fill known information (e.g., the overlapping customer identification information). As shown in FIG. 3C, the customer also enters his or her social security number and annual salary.

Figure 3D:

FIG. 3D illustrates a screen for inputting a one-time password sent to the customer. The one-time password can be transmitted to the customer's mobile computing device so as to further verify that the customer acknowledges the application.

Figure 3E:
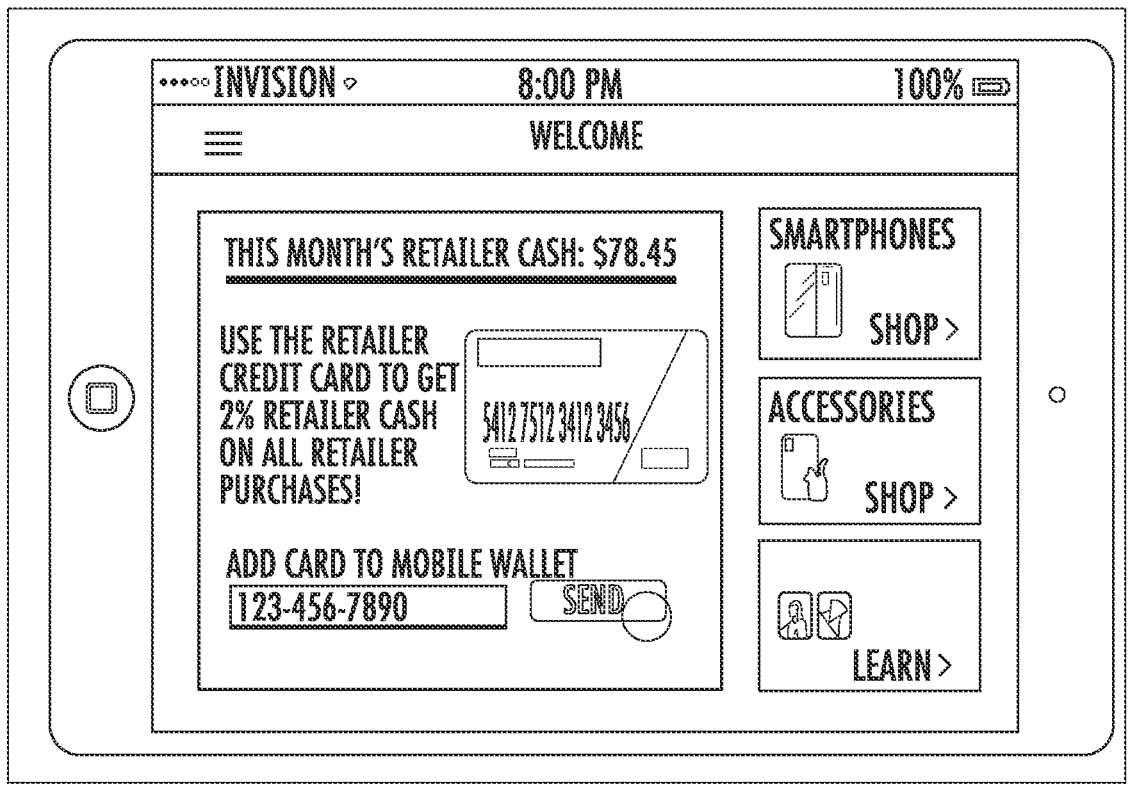

FIG. 3E illustrates a screen shown to the customer in response to the customer being approved for the payment account. In the implementation shown in FIG. 3E, the screen includes a field for the customer to input his or her phone number of the mobile computing device operating the mobile wallet to which the payment token is to be provisioned. In other implementations, the payment token is automatically provisioned without requiring this step.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method performed by an issuer computing system, the method comprising:
   receiving, by the issuer computing system from a retailer computing system, identification information for a customer;
   pre-approving, by the issuer computing system, the customer for a payment account based on the identification information;
   receiving, by the issuer computing system, a request to open the pre-approved payment account;
   receiving, by the issuer computing system from the retailer computing system, account registration information regarding the payment account and a mobile device identifier associated with a mobile device, wherein the mobile device identifier is received from the retailer computing system based on a first near-field communication (NFC) tap between the mobile device and a transceiver of the retailer computing system, wherein the mobile device identifier includes at least one of a secure element identifier, an International Mobile Equipment Identity ("IMEI") value, an electronic serial number ("ESN"), or a Media Access Control ("MAC") address;
   validating, by the issuer computing system, the mobile device as belonging to the customer based on the received mobile device identifier and information from the retailer computing system;
   binding, by the issuer computing system, the mobile device identifier to the customer based on the validation;
   approving, by the issuer computing system, the customer for opening the payment account based on the account registration information;
   establishing, by the issuer computing system, the payment account for the customer;
   generating, by the issuer computing system, a payment token for the payment account; and
   in response to establishing the payment account and generating the payment token, providing, by the issuer computing system, the payment token to the transceiver of the retailer computing system, wherein the payment token is automatically provisioned to a mobile wallet associated with the mobile device validated based on the mobile device identifier and information from the retailer computing system via a second NFC tap between the mobile device and the transceiver.

2. The method of claim 1, wherein the payment account is a private label credit card branded by a retailer associated with the retailer computing system.

3. The method of claim 1, wherein the payment token is automatically provisioned to the mobile wallet in connection with a transaction between the customer and a retailer associated with the retailer computing system.

4. The method of claim 3, wherein the transaction relates to a product or a service involving the mobile device operating the mobile wallet.

5. The method of claim 4, wherein validating the mobile device as belonging to the customer further comprises receiving, by the issuer computing system, indication of an acceptance from the customer to a phone binding arrangement.

6. The method of claim 1, wherein pre-approving the customer for the payment account comprises performing, by the issuer computing system, a soft credit pull based on the identification information for the customer.

7. The method of claim 1, wherein the account registration information is received by the issuer computing system from the retailer computing system.

8. The method of claim 1, further comprising:
   matching, by the issuer computing system, the identification information to an existing account held by the customer with an issuer associated with the issuer computing system,
   wherein the account registration information is retrieved from at least one of the identification information and a record associated with the existing account held by the customer with the issuer.

9. The method of claim 1, further comprising, transmitting, to the mobile device, an application regarding the payment account, wherein the application is pre-filled with the identification information.

10. The method of claim 9, wherein the account registration information is received by the issuer computing system from the mobile device associated with the customer.

11. The method of claim 1, wherein at least one of the pre-approving and the approving is completed by the issuer computing system using the account registration information without requiring a credit pull.

12. The method of claim 1, further comprising transmitting, by the issuer computing system, a pre-approval message providing an indication that the customer is pre-approved to open the payment account.

13. The method of claim 12, wherein the pre-approval message is transmitted by the issuer computing system to the retailer computing system in response to the pre-approving the customer for the payment account.

* * * * *